Figure 1:
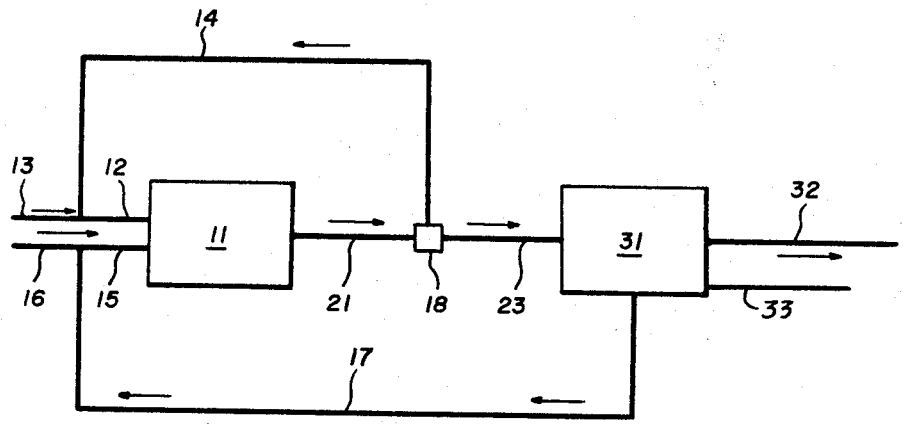

Nov. 19, 1968  M. F. GAUTREAUX  3,412,126
PROCESS FOR PRODUCING TRIALKYL ALUMINUM COMPOUNDS
Filed July 12, 1962  2 Sheets-Sheet 1

Nov. 19, 1968     M. F. GAUTREAUX     3,412,126
PROCESS FOR PRODUCING TRIALKYL ALUMINUM COMPOUNDS
Filed July 12, 1962     2 Sheets-Sheet 2

United States Patent Office 3,412,126
Patented Nov. 19, 1968

3,412,126
PROCESS FOR PRODUCING TRIALKYL
ALUMINUM COMPOUNDS
Marcelian F. Gautreaux, Baton Rouge, La., assignor to Ethyl Corporation, New York, N.Y., a corporation of Virginia
Filed July 12, 1962, Ser. No. 209,405
4 Claims. (Cl. 260—448)

INTRODUCTION

This invention relates to the manufacture of organoaluminum compounds. More particularly, the invention relates to a new and novel process for the manufacture and separation of trialkylaluminum compounds, wherein the alkyl groups are obtained in the product, in a limited or specific chain length range.

PRIOR ART, BACKGROUND AND PROBLEM

Of recent years, it has been demonstrated that certain organometallic compounds of aluminum, particularly the lower trialkyl compounds and especially triethylaluminum, can be most efficiently manufactured from aluminum, hydrogen and the corresponding olefins. See U.S. Patents 2,787,626 and 2,886,581, to Redman, and Ziegler et al. Patent 3,032,574, May 1, 1962. The availability of economically manufactured tri-lower alkyl-aluminum compounds has prompted consideration of their use for manufacture of additional chemical products. The most immediate use of trialkylaluminum compounds has been as catalyst components for the manufacture of polyolefin high polymers. However, the use of tri-lower alkyl-aluminum compounds in the synthesis of other organometallic materials and also in the synthesis of olefinic hydrocarbons or alcohols has also aroused considerable interest.

In the manufacture of olefins for example, the procedure can be the addition of multiples of ethylene molecules to a tri-lower alkylaluminum compound, illustratively, triethylaluminum. When this has taken place, a tri-higher alkylaluminum product is obtained, and this is susceptible to generation of olefins corresponding to the alkyl groups by thermal decomposition, by displacement at different conditions with further reaction with ethylene, with or without the presence of a catalyst. When alcohols are desired, the tri-higher alkylaluminum compounds can be oxidized to provide the corresponding aluminum trialkoxide, as is described in Ziegler et al. Patent 2,892,858. The alkoxides, in turn, can be hydrolyzed with a dilute mineral acid to yield the aluminum salt and alcohols corresponding to the alkyl groups.

These important potential uses of compounds such as triethylaluminum compounds have been greatly limited by certain peculiarities of the reaction briefly mentioned above, of addition of multiples of ethylene moles per mole of a tri-lower alkylaluminum compound. This reaction, hereinafter referred to as the chain growth reaction, is characterized by the fact that a trialkylaluminum reacting with ethylene does not differentiate in the ability to add ethylene according to the length of the individual alkyl radicals or groups existing at any particular time. As a result, the mixture resulting from a chain growth process is a mixture wherein the alkyl groups exhibit a statistical or Poisson type distribution of chain length. This relationship has been published, and the concordance between the experimentally observed product composition and the mathematically predicted composition has been demonstrated. Generally, the composition of a chain growth product can be represented by the following expression:

$$X_p = \frac{n^p e^{-n}}{p!}$$

wherein $n$ = number of moles of ethylene reacted per original alkylaluminum bond,
$p$ = number of ethylene moles added per alkyl group of a component of the product and
$X$ = the mole fraction of the alkyl groups formed by the reaction.

The foregoing provides a simple mode of reliably predicting a product composition when the feed is a specific trialkyl aluminum, (all alkyl groups being identical.) When the initial feed to a chain growing operation contains different alkyl groups, the production follows the same principles but is slightly more complicated in expression.

It should be understood that it is very convenient to express these compositions in terms of the alkyl groups, rather than in terms of trialkylaluminum components. It has been discovered that trialkylaluminum compounds tend to reproportionate with time, so that alkyl groups of different lengths are redistributed in a mixture, and hence the trialkylaluminum molecular species present at any one instant represents a statistical mixture. In other words, when, for example, ethyl, butyl and hexyl alkyl groups are present in a mixture it is not, at equilibrium, equivalent to a mixture of triethylaluminum, tri-n-butylaluminum and tri-n-hexylaluminum, but rather a statistical mixture of these species plus the other possible species, e.g., diethylbutylaluminum, ethyldibutylaluminum, ethylbutylhexylaluminum, ethyldihexylaluminum, butldihexylaluminum, and so forth. It will also be apparent that referring to the composition of a mixture in terms of the mole concentration of alkyl groups (or alkylaluminum fractions or moieties, represented by the expression Ral, wherein al is ⅓ atom equivalent of aluminum) is the same, numerically, as considering all of any one specific alkyl group as present in a trialkylaluminum compound wherein all the alkyl groups are of that identity. Such a concentration, then, represents also the limiting quantity of amount of that specific trialkylaluminum species which could conceivably be present, if all the alkyl groups of that particular length were removed and isolated in the form of the corresponding trialkylaluminum compound.

Because of the above described Poisson distribution of product components, from a chain growth operation, it is clear that it has not been possible to convert a tri-lower trialkylaluminum compound with great specificity to a desired tri-higher alkylaluminum compound, or even a mixture of tri-higher alkylaluminum compounds of narrowly restricted alkyl chain length. Stating the problem differently, if, for example, it were desired to convert triethylaluminum to say, tridecylaluminum exclusively, the above described statistical distribution of alkyl groups formed in chain growing would prevent entirely this being realized. Similarly, even if it were desired to convert the triethylaluminum initially fed to a narrow cut mixture, for example, a mixture of trialkylaluminum components having only 14 and 16 carbon atoms, illustratively, that also would be impossible, because of the concurrent formation in all instances of alkyl substituents ranging from 4 carbon atoms to a higher carbon atom number.

Because of the above described lack of ability to carry out a chain growth reaction with a highly "directed" product distribution, it has not been heretofore possible to manufacture with great efficiency tri-higher aluminum alkyls having a restricted range of alkyl group chain lengths, and at the same time attain any degree of efficiency of the utilization of the starting materials, a tri-lower alkylaluminum and ethylene. Similarly, it has not been heretofore possible to manufacture olefins or alcohols, or other chemical derivatives of tri-alkylaluminum compounds with a similar efficiency of utilization of the starting materials. A great need thus has existed for an effective process for the manufacture and recovery of trialkylaluminum products, wherein the alkyl groups are restricted to limited chain length ranges, or even to individual species.

OBJECTS

The object of the present invention is to provide a process for the manufacture and recovery of trialkyl-aluminum compounds, wherein the alkyl groups of the product are limited to a desired chain length, and the inherent disadvantages of the statistical distribution of products of a chain growth reaction are circumvented. Another object is to provide in combination a chain growth process and a novel recovery technique, and recovering trialkylaluminum products of predicted and necessary characteristics, specifically, with respect to the range of alkyl chain lengths present in the trialkylaluminum product separated. Other objects will appear hereinafter.

THE INVENTION—GENERAL

In its most general form the present invention involves firstly a chain growing operation, comprising chain growing ethylene on the alkyl groups of a tri-lower alkylaluminum feed to generate an intermediate trialkylaluminum stream including higher and lower alkylaluminum moieties or fragments. The tri-lower alkylaluminum feed includes the fresh tri-lower alkyl stream, corresponding at least approximately to the final product removed in moles, and a recycled tri-lower alkylaluminum fraction. As mentioned, the intermediate trialkylaluminum stream is then subjected to a separation characterized by a separation of a product containing stream having a higher proportion of desired alkyl substituents therein than predictable by statistical expectations, leaving or forming thereby a tri-lower alkylaluminum stream, which is recycled in part to the chain growing step. In a certain preferred category of embodiments, the chain growing step of the process is confined to generate the desired alkylaluminum groups or moieties as the uppermost significant component or fraction of the gross trialkylaluminum intermediate stream generated in the chain growing step. By this is meant that even though this necessarily results in a relatively low fraction of the desired alkylaluminum groups in the chain growing step effluent stream, or intermediate trialkylaluminum stream, certain beneficial results are achieved thereby, namely, the substantial reduction of alkyl groups of even greater chain length than those desired. In other instances, the chain growing operation is carried out to maximize the concentration of the desired alkylaluminum moieties in the chain growing effluent, and in such instances a dual separation is applied thereto, including a first separation wherein lower-trialkyl-aluminum components are separated, and a second separation wherein tri-higher alkylaluminum components, viz., those higher than the desired product fraction, are isolated.

The separation operations necessary to accomplish the objects of the invention are varied. In all instances, as indicated, a separation is achieved wherein the degree of separation is greater than is anticipated by the equilibrium condition of a trialkylaluminum mixture having alkyl groups of random or varying length. In other words, the separation is in excess of the statistical expectation for the trialkylaluminum molecular species. All forms of the separations applied are characterized by the continued maintenance of and separation from a liquid phase from which the non-desired alkyl aluminum moieties have already been removed in part. In other words, sufficient contact time is provided so that the molecular species, which have been eliminated from the liquid phase, can be reformed and thus made available for separation. The reasons for the effectiveness of the separations are not fully clear, but it is believed that the separation of a phase enriched, for example, in higher alkylaluminum moieties, leaving a phase enriched in the lower alkylaluminum moieties, accompanied by adequate time after such a separation, permits additional redistribution to occur, whereby individual molecular species thus are established which in turn can migrate to the several phases. Among the modes of separation which have been established as effective are distillation, particularly molecular distillation at high vacuums, extraction with certain solvents, or with the use of a pair of only partly-miscible solvents, and selective crystallization. Illustrations of these embodiments will appear hereinafter.

The time and temperature to which the liquid phase undergoing operation is exposed, are both significant factors. However, relatively brief residence times are permissible to obtain the desired results. Residence times of as low as one second will result in the greater than anticipated separation. Ordinarily, however, residence times in staged operations, of at least five seconds and even more commonly, thirty seconds to several hours, will be employed. As indicated, temperature is also a highly significant factor. As will be explained more fully hereinafter in typical operations, it has been found that a decrease in temperature surprisingly results in an improvement in the degree of separation accompanied under any given conditions. The beneficial effects of low temperatures are partly offset by the reduction in capacity of certain embodiments. In extraction operations, a decrease in temperature results in a substantial increase in a separation coefficient, but this benefit is partly offset by the lower solubility of trialkylaluminum compounds in a solvent, with such a decrease in temperature.

FIGURES

Figure 2:
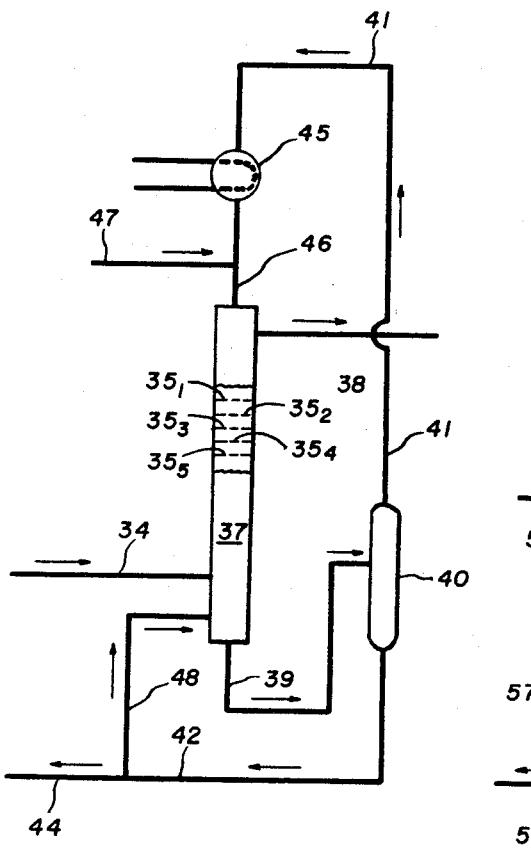
Figure 3:
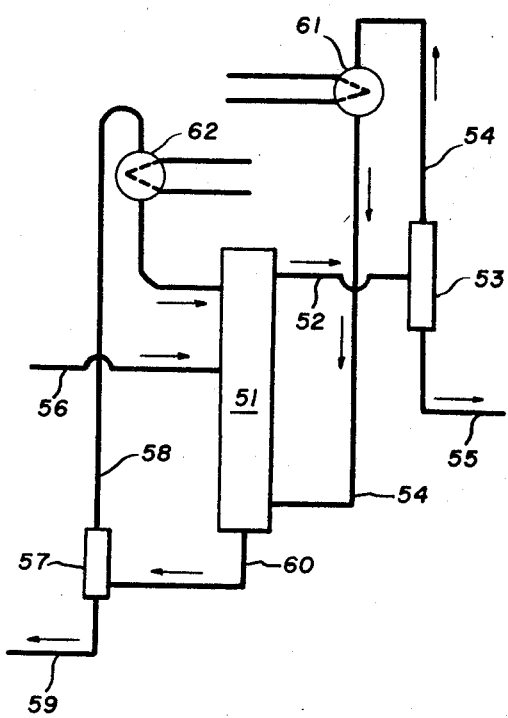
Figure 4:
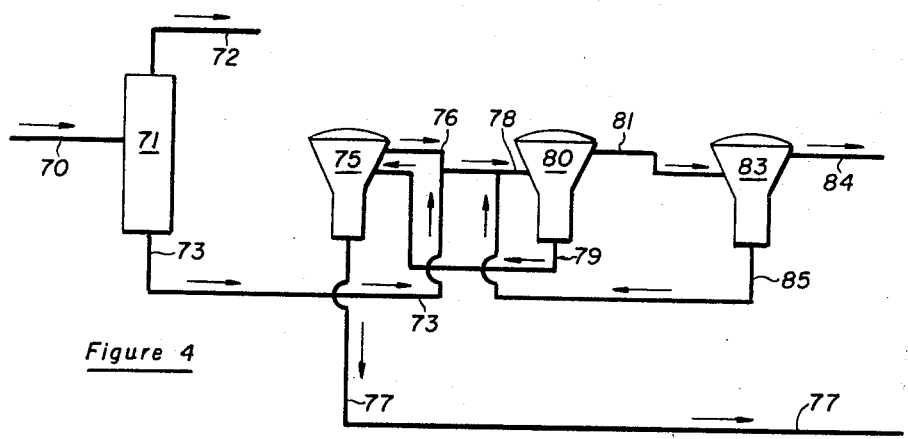
Figure 5:
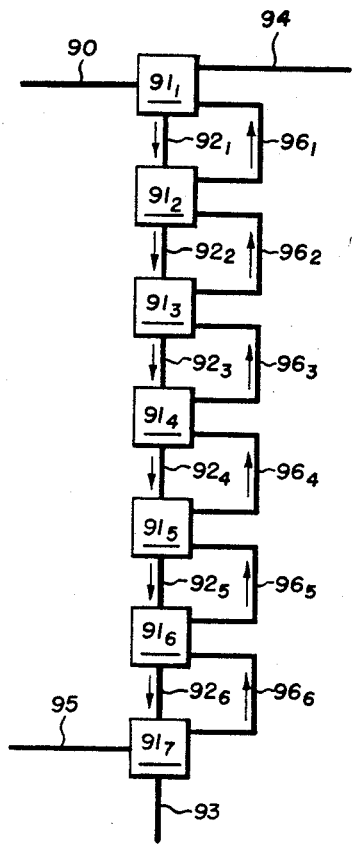
Figure 6:
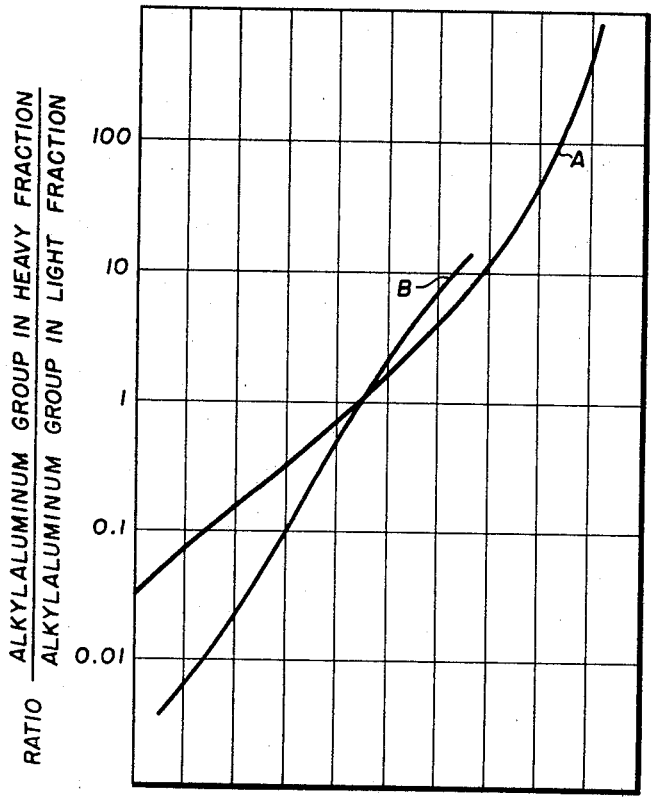

The details of the various embodiments of the invention, and of the best mode for its operation, will be clear from the detailed examples and description hereinafter, and from the figures, wherein:

FIG. 1 is a generalized representation applicable to all forms of the process,

FIG. 2 is an illustrative schematic layout of embodiments using a single solvent, FIG. 3 is a schematic layout of an installation using a two solvent system, FIG. 4 is a schematic layout showing a multi-staged distillation operation as the separation portion of the process, FIG. 5 is a schematic embodiment employing a crystallizing operation for the separation portion of the process, and FIG. 6 is a graphical representation showing the surprising benefits which have been realized as compared with the theoretically perfect separation which would be expected as the absolute limiting separation attainable.

DESCRIPTION AND EXAMPLES

Referring to FIG. 1, it is seen that in all instances a process installation includes two main sections, a chain growth section and a separation section. It will be understood that the chain growth reactor 11 herein shown is only schematic and may assume many different proportions. Similarly, the separation section 31, as will be shown for more detailed embodiments hereinafter, may involve several different possible process devices and arrangements.

The net feeds to the installation include a fresh ethylene feed supplied through the fresh ethylene line 13, and a tri-lower alkyl aluminum feed, provided through line 16. The ethylene feed is joined by a recycle ethylene line 14, combining to form the gross ethylene feed line 12. The tri-lower alkyl aluminum feed 16 is joined by a recycle line 17, which conveys thereto a recycled trialkyl aluminum stream, having lower alkyl groups than the desired product. The two lines form the gross trialkyl aluminum feed line 15.

A chain growth reactor effluent line 21 passes to a flash chamber 18, from which the recycle line 14 above mentioned conveys non-reacted ethylene to return to the chain growth section. The transfer line 23 from the flash chamber 18 passes the material to the separation zone or section 31 wherein at least a substantial portion of the alkyl aluminum groups or moieties, Ral, are separated from said stream and are removed from the separation zone through the recycle line 17. The product line 32 then contains a substantially enriched material or product stream, i.e., enriched in the higher alkyl aluminum moieties and the trialkyl aluminum compounds containing these desired groups.

It will be understood that the separation zone 31 can accomplish a single resolution, viz, a separation of the two streams, one characterized by low alkyl aluminum groups and the other by higher alkyl aluminum groups. This variant is particularly useful when only one product stream is desired, in this instance the fraction having the higher alkyl aluminum moiety. In many instances it will be advantageous to provide two separations, first making a split of a tri-lower alkyl fraction, and thereafter a split of the remaining material into an intermediate and a tri-higher alkyl aluminum fraction. In such instances, yet another product line 33 will be involved for delivery of the second product stream.

In certain cases, dependent on the conditions of operation of the chain growing operation, minor quantities of olefin hydrocarbons, in addition to the excess ethylene, are present in the effluent stream from the chain growth section 11. Such olefins are more prone to be present when the chain growth is at reasonably elevated temperatures. In these cases, supplemental fractionation operations are frequently used to remove the olefins from the trialkylaluminum stream.

The principles of operation of the chain growth portion of the process are common to all forms, and hence this operation is best described separately. The effluent from a chain growth reaction involving a plurality of moles of ethylene, reacted with and added to a tri-lower alkyl aluminum feed is reasonably accurately predictable from the aforementioned general relationships.

The table below gives a typical chain growth reaction discharge composition, freed or substantially freed of unreacted olefins. This composition being particularly illustrative of embodiments of the process intended for the manufacture and recovery in a good concentration or purity of trialkyl aluminum components wherein the alkyl chain lengths are from 12 to 16 carbons. For purposes of representation of composition and for further discussion herein, the term "alkyl aluminum moiety" is used, this being the group or portion represented by the expression Ral, wherein R is an alkyl group and al is one-third atomic equivalent of the aluminum. The concept of an alkyl aluminum moiety is particularly helpful, inasmuch as, in a trialkyl aluminum system, having a substantial number of different alkyl groups present as radicals, a large number of discrete molecular species of trialkyl aluminum materials will be present, having three different alkyl groups therein. In fact, it is found that, in any one instant, that the distribution of the potential number of trialkyl aluminum species existent is the statistical possibility from the number of alkyl radicals present. Accordingly, the concept of an alkyl aluminum moiety as defined above is particularly helpful in identifying a system, inasmuch as such an alkyl aluminum moiety can yield only one single derivative such as an olefin or an alcohol. It will be understood that expressing a system composition in terms of mole percent of alkyl aluminum moieties, Ral, wherein R is any of a number of different alkyl groups, is equivalent to expressing the system composition on the assumption that the alkyl groups present are solely present as the alkyl groups of trialkyl components wherein each alkyl is identical.

The table below gives stream compositions in terms of alkyl aluminum moieties, identified according to the carbon atoms in the alkyl group.

Bases: Provide one mole make-up triethyl aluminum, $(C_2H_5)_3$ Al, per pass, or per 6.58 moles of recycle, providing one mole of ultimate product. React 0.675 mole ethylene/(Ral group) (pass).

| Alkyl Aluminum Group: | Mole Percent | |
|---|---|---|
| | Recycle (17) | Product (23) |
| $C_2$ | 15.8 | 13.7 |
| $C_4$ | 21.6 | 18.8 |
| $C_6$ | 22.5 | 19.7 |
| $C_8$ | 22.4 | 19.4 |
| $C_{10}$ | 17.4 | 17.0 |
| $C_{12}$ | 0.7 | 8.2 |
| $C_{14}$ | | 2.5 |
| $C_{16}$ | | 0.6 |
| $C_{18}$ | | 0.1 |
| $C_{20}$ | | 0.01 |

In the course of the operation, the results being illustrated by the foregoing, it is seen that a recycle stream, which would be provided through line 17 to the reactor 11 of FIG. 1, is changed in composition from a trialkyl aluminum mixture having virtually no or very minor quantities of alkyl aluminum groups of 12 to 16 carbon atoms, to an effluent stream (after removal of excess ethylene in the vaporizer or flash vaporizer 18) having approximately 11.3 mole per cent of components in the range of dodecyl to hexadecyl aluminum moieties.

Other effluent compositions are readily established and will be shown in some of the examples hereafter.

In carrying out the chain growth reaction, the results being typified above, various reactor techniques and apparatus can be employed. Illustratively, a type of reactor and reaction technique which can be employed is that described in the Union of South Africa application 60/4695, by Dr. Kurt Zosel. The Zosel operation is characterized by spraying the tri-lower alkyl aluminum compound into a stream of ethylene at certain flow velocities, and at temperatures of from about 120 to 200° C., the reaction chamber being an extended tube having a restricted diameter of not more than about three centimeters. Another method of carrying out a chain growth is as illustrated in U.S. Patent 2,977,381, to Roha et al., wherein ethylene gas is fed into a stirred slurry or liquid, in an autoclave. Roha et al. describe a reaction system including aluminum trichloride and titanium tetrachloride. The catalyst system employed by Roha et al. is not necessary to achieve chain growth. If desired, a stirred autoclave reactor can be employed. It is preferred to use, in the various embodiments of the present invention, an extended conduit reactor zone wherein no extraneous material is deliberately added, and to conduct the chain growth process at moderate temperatures of the order of 80–120°, but always below about 120° C. Suitable residence times for the chain growth operation are dependent on the reaction temperatures, reactants, and the product composition ranges desired. Suitable reactions can be carried out with average residence times of from one-half to four or five hours. One or two hours residence time is preferred when an effluent stream, such as given above, is to be made.

As virtually all forms of the invention, as already mentioned, employ a recycled quantity of tri-lower alkyl material, it will be understood that the average composition of the gross feed to the chain growth reactor is variable, dependent upon the quantity of recycle, the desired product trialkyl aluminum fraction, and the specific identity of the starting or make-up trialkyl aluminum compound. In practically all instances, the make-up trialkyl aluminum is triethyl aluminum. In the typical operation described above, it is seen that butyl, hexyl, octyl, and decyl aluminum groups amount to about 75 mole percent of the chain grown material transferred to the separation section, whereas the dodecyl, tetradecyl, and hexadecyl aluminum groups, representing the desired end fraction, amounts to slightly over 11 mole percent.

In other typical operations, the effluent stream can be "peaked" at, for example, the hexadecylaluminum, tetradecylaluminum, or other alkylaluminum groups.

SINGLE SOLVENT OPERATION FOR SEPARATION

One highly effective mode of carrying out the separation step of the present process involves the use of a single liquid solvent. In making the separation of the trialkyl aluminum stream coming from the chain growing step, and apparatus for such a separation is schematically illustrated in FIG. 2.

Referring to FIG. 2, the line 34 is a feed line from the chain growing step. The principal apparatus unit is the extraction column 37, which is fitted with a plurality of pierced plates $35_1$–$35_5$ for staging the extraction in a countercurrent manner as hereinafter described. A bottoms line 39 from the column 37 leads to a solvent vaporizer 40, which makes possible at least a partial separation of the solvent and the aluminum alkyls contained therein, as delivered from the extraction column 37. The solvent in most instances is vaporized and discharged through the overhead line 41 of the vaporizer 40, and is thereafter condensed, in condenser 45, from which a solvent line 46 conducts the condensed solvent back to the extraction column 37. Make-up solvent is provided through line 47.

The bottoms from the vaporizer 40 are discharged by a bottoms line 42, which in turn is split into a recycle line 44, and a reflux line 48. In carrying out an embodiment of the process employing a single solvent separation technique, employing the apparatus above described, various solvents can be employed. In particular, a highly preferred class of solvents are certain fluorochloro hydrocarbons. It is found that these materials are highly effective in effecting a separation wherein the tri-lower alkyl constituents are selectively concentrated in the solvent phase, and the tri-higher alkyl constituents are thus separated to a satisfactory degree. The following example, employing a particular and highly preferred member of this class of solvents, is illustrative.

EXAMPLE 1

The feed stream supplied through line 34, to this operation is a trialkyl aluminum mixture. The composition is as follows:

| Alkyl aluminum component: | Composition mole percent |
|---|---|
| $C_2$ | 13.7 |
| $C_4$ | 18.8 |
| $C_6$ | 19.7 |
| $C_8$ | 19.4 |
| $C_{10}$ | 17.0 |
| $C_{12}$ | 8.2 |
| $C_{14}$ | 2.5 |
| $C_{16}$ | 0.6 |
| $C_{18}$ | 0.1 |
| $C_{20}$ | 0.01 |

In addition to the fresh feed above identified supplied through line 34, a recycle stream or reflux stream is provided through line 48 in the proportions of about 6 parts by volume per part of the fresh feed, this stream having the composition as given below:

| Alkyl aluminum component: | Composition mole percent |
|---|---|
| $C_2$ | 5.17 |
| $C_4$ | 14.73 |
| $C_6$ | 27.60 |
| $C_8$ | 28.70 |
| $C_{10}$ | 22.90 |
| $C_{12}$ | 0.86 |

This reflux stream has very minor quantities of the solvent, and is, with respect to the trialkyl aluminum content, highly enriched in the lower alkyl aluminum moieties.

The solvent feed to the column 37, provided through line 49, includes vaporized material supplied through line 41, and a small amount of make-up, to compensate for minor losses, and corresponds to approximately 51 parts by weight per 100 parts of fresh feed supplied to line 34.

The extraction column 37 is operated with an overhead temperature of 40° C. and an overhead pressure of 275 p.s.i.g., in order to assure that the solvent will remain in the liquid phase during the extraction operation, as the boiling point of this material is −48.8° C. A total of about 200 stages is provided in the column, which operates with a stage efficiency of about 40 percent. The trialkyl aluminum product stream remaining after contacting the feed materials with the difluorochloromethane in the column is discharged through line 38 and has the product composition given below:

| Alkyl aluminum component: | Composition mole percent |
|---|---|
| $C_8$ | 0.3 |
| $C_{10}$ | 18.95 |
| $C_{12}$ | 57.40 |
| $C_{14}$ | 18.46 |
| $C_{16}$ | 4.07 |
| $C_{18}$ | 0.72 |
| $C_{20}$ | 0.13 |

It will be noted that the above defined product stream contains approximately 80 weight percent of alkyl aluminum moieties in the 12–16 carbon atom alkyl range and 99 weight percent, in the 10–16 carbon atom range. When said fraction is subsequently treated by oxidation and hydrolysis of the alkyl aluminum groups, to provide corresponding monohydric alcohols, the alcohol product derived will contain also about 99 percent alcohols in the $C_{12-16}$ range, these alcohols corresponding to those found in cocoanut oil, and this material thus being highly effective for uses for which this natural material has heretofore been provided.

The bottoms stream from the extractor 37, discharged through line 39, is a solution of tri-lower alkyl components in the difluorochloromethane solvent. This stream is passed to the vaporizer 40, wherein a sharp separation is achieved by addition of heat and a reduction in pressure. Heat exchangers and compressors for this operation are not shown. Because of the very high volatility of the solvent, separation is quite efficient, even without fractionation, and hence the bottoms from the vaporizer 40, discharged through line 42, contains only about 0.01 weight percent of non-vaporized solvent.

When the concentration of the $C_{12-16}$ alkyl aluminum moieties is desired to be even greater than in the foregoing operation, this is readily achieved by employing additional separation stages, rather than the 200 stages employed in the foregoing example. Alternatively, increase in the amount of "reflux," viz, the recycled tri-lower alkyl aluminum stream through line 48 to the bottom of the extractor column 37, can be increased.

A particular and highly beneficial feature of this embodiment is the fact that minor quantities of fluorochloroalkane materials, recycled to the chain growing operation, in the recycle stream in line 44, does not adversely affect the chain growing operation. This is of particular benefit for other embodiments, wherein less volatile fluoroalkanes may be employed, which would not, then, be so rigorously separated by the vaporization step as conducted in the vaporizer 40.

In addition to the difluorochloromethane employed in the foregoing example, a variety of additional fluoroalkane compounds can be employed in other embodiments and in some instances may be even more effective. Illustrative examples of additional solvents suitable for the operation are numerous other materials of from one to four carbon atoms, including both acyclic and cyclic materials, and having at least one fluorine atom per carbon in the molecule. Illustrative examples of such materials are trifluoromethane, trifluorochloromethane, hexafluoroethane, trifluorobromomethane, 1,1-difluoroethane, octafluorocyclobutane, 1,1,2,2-tetrafluoro-1,2-dichloroethane, and others. When these materials are employed instead of difluoromethane in the operation illustrated by Example 1, similar results are attained.

TWO SOLVENT OPERATION FOR SEPARATION

Another method of resolving or separating the trialkyl aluminum compounds released from a chain growing operation involves the use of a pair of solvents, the alkyl aluminum moieties being distributed in these solvent components. The solvents are at least partially immiscible. Usually, the system is agitated and then the two phases are separated, the alkyl aluminum moieties being distributed in the phase. Apparatus is schematically shown in FIG. 3 suitable for this variation or option in recovery. It will be understood that this apparatus can be utilized in combination with various forms of chain growing reactors and other ancillary apparatus.

Referring to FIG. 3, the principal apparatus unit is an extraction column 51, which can be a column such as is disclosed by Scheibel in Patent No. 2,493,265. The details of construction of the column are not shown, and in fact, other liquid-liquid contacting devices can be also very effectively used. A feed line 56 is provided to feed to an intermediate point of the column 51 the trialkyl aluminum mixture from the chain growing operation. An overhead line 52 is provided for discharge of a light solvent phase, the overhead line connecting to a vaporizer 53. The bottoms line 60 from the extraction column 51 is provided to discharge a heavy solvent phase. A flash vaporizer 57 serves the purpose of vaporizing at least a part of a heavy solvent, a discharge line for this vaporized solvent 58 being provided. The bottoms from the vaporizer 57 include a major portion of the aluminum alkyls in the bottoms stream. A condenser 61 receives the vapor from the light solvent vaporizer 53, the condensate line 54 therefrom being provided to retransfer said solvent to the column 51. A similar condenser 62 is provided for receiving the flashed heavy solvent from the heavy solvent vaporizer 57, the condensate in turn being returned to the extractor column 51. A make-up line, not shown, is provided for each of said solvents. The bottoms liquid line 55 from the light solvent vaporizer 53 is provided to discharge the aluminum alkyl-rich components released by the solvent vaporizer 53.

The requisites of the two solvents employed are relatively straightforward and can be met by a variety of pairs of materials. Firstly, two phases must exist when the solvents are contacted, and in the presence of the trialkyl aluminum constituents being processed. Secondly, the solvents should both be non-reactive, or substantially non-reactive with the trialkyl aluminum materials and with one another, although the existence of mild complexes is not precluded. By non-reactive is meant that no significant degradation of the trialkyl aluminum constituents occurs at the temperatures of operation, by reaction of either of the solvents. Lastly, the solvent pair should exhibit different selectivity toward the alkyl aluminum moieties present in the system. The phases involved are also necessarily of different densities to facilitate separation.

The solvents employed may be and usually are miscible in part, one with the other, and both of said solvents are necessarily solvents to a degree for trialkyl aluminum compounds or alkyl aluminum moieties. The first solvent of the pairs employed are usually members of the groups consisting of haloalkyl ethers, di-lower alkyl ethers of alkylene glycols, and di-lower alkyl ethers of poly alkylene glycols. The second of the solvent pairs is a hydrocarbon, usually of a predominantly paraffinic character. Thus, a pure hydrocarbon can be employed, such as n-decane, or dodecane or other paraffins of from about three to about twenty-two carbon atoms. Normally solid compounds are, of course, avoided as pure solvents. It will be noted that quite volatile liquids can be employed, in fact, even compounds such as propane, which is gaseous at normal temperatures. The use of such normally vaporous alkanes or paraffinic hydrocarbon mixtures as the second solvent in certain embodiments will require operation at relatively low temperatures and with supra-atmospheric pressures. Highly refined paraffinic white oils, of which there are a number commercially available, are frequently used to great advantage. In operation, the trialkyl aluminum feed, a mixture of numerous different trialkyl aluminum compounds, is contacted, usually with agitation, with the two solvent system and the trialkyl aluminum constituents are distributed in the two-phases. A finite period of time is required for the contacting and separations (by this meaning the physical separation of the two liquid phases) in order to achieve the highest degree of effectiveness. The contacting time required for this staged operation will depend to a great extent on temperature, the identity of the solvents of the pair, and on other factors. The separated phases resulting from the contacting and the settling or partial phase separation include, then, a first solvent rich phase and the second solvent rich phase, and in said phases it is found that the alkyl aluminum moieties, viz., the Ral groups, are distributed between the solvents, a higher concentration of the lower alkyl aluminum moieties being present in the first solvent, and an enriched concentration of the higher alkyl aluminum moieties being provided in the second solvent phases.

It will be immediately apparent that numerous physical techniques are available for conducting the above separation operation. Thus, instead of a columnar operation, employing a multi-stage or plate column, discrete batches can be processed in individual mixing-settling tanks, the separated phases being then contacted in separate tanks with opposite phases derived from other operations arranged in cascade form.

The composition of the solutes, or alkyl aluminum moieties in the phases from such an embodiment, and relative amounts thereof, is affected by a number of variables. An inherent limiting factor is of course the quantity of feed, and the relative amounts of the several alkyl aluminum moieties. Other factors which can be varied, at least to some degree, in effecting a separation are the identity and proportions of the solvents, the number of contacting-separating stages or equivalents to discrete stages employed, and the temperature as already mentioned.

To illustrate the operation of this class of embodiments, Example 2 shows an operation employing a typical pair of solvents, these being bis($\beta$-chloroethyl) ether and a white oil having a Saybolt viscosity, at about 100° F., of 69, are used as the first and second solvents respectively.

Example 2

The feed composition in this operation had a composition as given below, expressed in mole and weight percents of the alkyl aluminum moiety groups present.

| | Composition | |
|---|---|---|
| | Mole Percent | Weight Percent |
| Alkyl aluminum component: | | |
| Ethyl aluminum | 22.6 | 5.5 |
| Butyl aluminum | 10.0 | 4.8 |
| Hexyl aluminum | 12.5 | 8.9 |
| Octyl aluminum | 10.8 | 10.2 |
| Decyl aluminum | 12.0 | 14.3 |
| Dodecyl aluminum | 10.9 | 15.5 |
| Tetradecyl aluminum | 8.4 | 14.0 |
| Hexadecyl aluminum | 6.2 | 11.3 |
| Octadecyl aluminum | 3.8 | 7.7 |
| Eicosyl aluminum | 1.8 | 4.2 |
| Higher aluminum | 1.0 | 2.6 |

The feed stream of the above composition, received from a chain growing operation, was fed through line 56, at a rate providing a through-put in the extraction column 51 of approximately 1.4 pounds/(ft.$^2$) (hr.). The rate of feed of the bis(β-chloroethyl) ether introduced at the top of the column, including make-up, was at the rate of about 220 pounds/(ft.$^2$) (hr.). The hydrocarbon solvent introduced through the line 54, with make-up, was at the rate of about 30 lb./ft.$^2$) (hr.). In this operation the bis(β-chloroethyl) ether solvent was the continuous phase and this phase descended through the column, while the hydrocarbon phase was discontinuous and rose through the column. A total of 92 stages were provided, each stage being an agitation and a calming section as in the normal Schiebel column. The column was maintained at a temperature of about 25° C., and operation was continued for several hours at substantially uniform conditions. In the course of passage of the solvent phases through the column, until equilibrium was attained, mutual partial solubility of one solvent in the other resulted in a slight change in the volumetric ratios of solvents, so that the hydrocarbon phase discharged through line 52 was decreased, and the ratio of bis(β-chloroethyl) ether to hydrocarbon phases was about 10:1.

Portions of the discharged phases were retained as samples and analyzed for distribution of the alkyl aluminum groups in each phase with the results tabulated below:

Compositions expressed in terms of weight concentrations of $R_3Al$ where R=alkyl group

| Carbons in alkyl group R | In feed | In oil phaseout | In bis (β-chloro-ethyl) ether phaseout |
|---|---|---|---|
| 4 | 6.3 | 0.5 | 5 |
| 6 | 11.2 | 1.5 | 17.7 |
| 8 | 13.1 | 3.0 | 20.5 |
| 10 | 18.1 | 7.0 | 20.7 |
| 12 | 19.3 | 21.5 | 18.2 |
| 14 | 17.4 | 34.0 | 11.0 |
| 16 | 14.3 | 32.5 | 7.8 |

In addition to the alkyl groups of 4 to 16 carbon atoms, inclusive, reported above, the feed of trialkyl aluminum components also included minor concentrations of ethyl radicals, and of alkyl radicals of 18 and more carbon atoms. These groups are not reported above, because restriction of the concentrations to the 4 to 16 carbon atom alkyl groups shows more clearly the high degree of effectiveness of the process. Expressing the above results in a different manner, the ratio of trialkyl aluminum components having from 12 to 16 carbon atoms alkyl groups, to trialkyl aluminum components containing 4 to 10, inc., carbon atom alkyl groups, was as follows:

| In feed | In oil phase overhead | In solvent phase bottoms |
|---|---|---|
| 1.04 | 7.3 | 0.59 |

A large percentage of the hydrocarbon solvent in the second solvent phase delivered through line 52 is distilled by the recovery unit 53, condensed in the condenser 61 and returned through line 54 to the extraction unit or tower 51. Similarly, the first solvent is fractionated, at least in part, from the bottoms stream 60, for return to the extractor 51. The alkyl aluminum containing stream from the first solvent recovery unit 57 is returned, at least in part, to the chain growth reaction.

If desired, instead of the above described separation, the degree of separation can be further increased as shown by the following example.

Example 3

The operation of Example 2 is repeated, using the same feed source and the operating conditions described. However, a total of about 300 stages are provided and, in this case the hydrocarbon phase overhead is virtually free of alkyl aluminum moieties having up to eight carbon atoms. In other words, the ratio of $C_{12-16}$ groups to $C_{4-10}$ groups, in the hydrocarbon phase discharged, is increased to about 100:1. In addition, the hydrocarbon phase contains about 95 percent of the dodecyl aluminum moieties fed to the process. The split of higher and lower alkyl aluminum moieties is even higher than the above mentioned split of the dodecyl aluminum groups.

The usual objective of all embodiments of the invention is to obtain a desired degree of separation of one fraction, in terms of alkyl groups of the alkyl aluminum moieties, from another group in the feed mixture. Thus, in the foregoing examples, it was desired to separate a fraction of dodecyl through hexadecyl aluminum moieties from the lower alkyl aluminum moieties. For more specific characterization of an embodiment, it is convenient to express the performance in terms of an alkyl aluminum moiety which is split, that is, its concentration in the hydrocarbon solvent phase being about the same as the concentration in the first solvent phase discharged. In other words, the ratio of concentrations of that particular moiety, in the two outlet phases is unity. In the case of Example 1, the split was at the tetradecyl aluminum moiety. The distribution of other alkyl-aluminum groups was as follows:

Ratio of concentrations in hydrocarbon phase to first solvent phase

| | |
|---|---|
| $C_{16}$ al | 15:1 |
| $C_{10}$ al | 0.08:1 |
| $C_8$ al | 0.02:1 |
| $C_6$ al | 0.015:1 |

Generally, the point of "split" will be the same for a given ratio of the two solvents, but the split of other components will be effected by the number of stages employed. To separate a given feed mixture at a different split point, the proportions of the two solvents can be varied.

To illustrate further the scope of the above type of separations, the following examples recite further operations using various "first" solvents with the same hydrocarbon as the second solvent.

| Example | First solvent | Volume ratio first solvent: second solvent | Stages | Approximate point of split |
|---|---|---|---|---|
| 4 | Bis(β-chloroethyl) ether | 6.5 | 60 | $C_{12}$ |
| 5 | Dimethyl ether of ethylene glycol | 2.5 | 100 | $C_{18}$ |
| 6 | 1,4-dioxane | 4.0 | 30 | $C_{14}$ |
| 7 | 1,3-dioxolane | 8.0 | 140 | $C_{10}$ |

In addition to the specimens of first solvents specifically illustrated above, numerous other solvents are available and can be successively employed as the first solvent. In addition to bis(β-chloroethyl) ether and 1,2-bis(β-chloroethoxy) ethane, others of this group which can be employed with good results are β-chloroethyl ethyl ether; β, β-dichlorethyl-ethyl ether; bis-(β-chloroisopropyl) ether; α,β-dichloroethyl ethyl ether; β,β,β-trifluoroethyl methyl ether and bis(β,β-difluro ethyl ether. Usually, compounds are preferred wherein the halogen substituents are chlorine or fluorine since the bromine or iodine containing compounds are more apt to attack the alkyl aluminum bonds, unless especially low operating temperatures are employed. In such instances, the lower temperatures increase the viscosity of the liquids, so that efficient mixing, and disengagement of the solvent phases is somewhat hampered. In addition to the haloethyl ethers illustrated, similar compounds comprising halo propyl and halo butyl ethers are suitable. Generally, however, the beta halogenated ethyl ethers are substantially preferred.

With respect to the di-lower alkyl ethers of alkylene glycols, similar additional representatives of this class can be employed. The diethyl, dimethyl, dipropyl, di-n-butyl and diisobutyl ethers of ethylene, propylene and n-butylene glycol can be substituted for dioxolane, which is the methylene ether of ethylene glycol. Similar dialkyl ethers having two different alkyl groups can be used, such as, for example, methyl ethyl, methyl propyl, ethyl propyl, or ethyl butyl ethers of ethylene glycol. Generally, alkyl groups of more than four carbons atoms are less desirable, because the higher alkyl groups impart a greater hydrocarbon character to the material so that there is a greater tendency to be miscible with the hydrocarbon solvent.

Similarly, with the lower alkyl ethers of polyalkylene glycols, other members of this group can be used with equal effectiveness. The dimethyl ether of diethylene glycol has already been mentioned. Dioxane is considered a member of this class, being an internal or cyclic ether of diethylene glycol. Alkyl substituted dioxanes are also suitable. Other examples of solvents in this group are the dibutyl ether of diethylene glycol, the ethyl-methyl ether of diethylene glycol, and the dimethyl ether of triethylene glycol.

With respect to the second solvent, as already mentioned, a normally liquid hydrocarbon is employed, preferably one of the commercially available, highly refined white oils, which are virtually free of aromatics and unsaturates. Typical properties of a suitable white oil, Marcol 70, are the following:

| | |
|---|---|
| Viscosity | 69 SS at 100° F. |
| Specific gravity | 0.8532 at 60° F. |
| Cloud point | 20° F. |
| Pour point | 10° F. |
| Distillation range | 543/846° F. |

Such a white oil is available as the trade named solvent Marcol 70. Other white oils, having similar chemical characteristics (free of unsaturates and aromatics) are available with a wide range of physical properties. Among the most significant physical properties are the viscosity of the oil and the specific gravity. Illustrative of the range of materials available as commercial "white oils" are those having Saybolt second viscosities, at 100° F. of as low as 32 and as high as about 350. The preferred range of viscosities is from 50 to 150 SS at 100° F.

As previously indicated, the hydrocarbon solvent used can be a pure compound, even a pure compound which is a vapor at ambient conditions. The identity of the hydrocarbon solvent affects the operating conditions employed, inasmuch as, with the more volatile hydrocarbon, lower temperatures are frequently required, as well as pressure operation, to assure two-phases existing, and the preservation of the hydrocarbon in a liquid phase. Illustrative of the wide choice of hydrocarbon solvents, the following table cites those demonstrated to be compatible with dioxolane:

| Hydrocarbon | Temperature for two phases, ° C. |
|---|---|
| Marcol 70 white oil SS 69 at 100° F. | <30 |
| Bayol D—white oil 32 SS at 100° C. | −4 |
| Trimethyl hexane | −22 |
| Isooctane | −19 |
| n-Heptane | −16 |
| Neohexane | −27 |
| n-Pentane | −24 |
| Petroleum ether | −24 |

VAPOR-LIQUID SEPARATION

Still another method of implementing the separation used in all embodiments of the process, involves a vapor-liquid separation. Owing to the susceptibility of the trialkyl aluminum components to thermal degradation, virtually all forms of separation techniques employing vapor-liquid phases will operate at quite low pressures, in order that low temperatures can be employed and thermal decomposition can be avoided.

Typical apparatus for use in a distillation separation is illustrated in FIG. 4. As in other embodiments, only the separatory apparatus is shown therein. Referring to FIG. 4, in this embodiment a preliminary flash or one stage separatory still 71 is used in combination with three "molecular" stills, 75, 80 and 83, arranged in cascaded manner. The feed to the installation namely, a trialkyl aluminum mixture from a chain growing reactor, having the excess ethylene flashed off, is provided through line 70 to the topping still 71. This apparatus, which can typically be a wiped film still, such as a Rodney-Hunt still, will typically operate at quite low pressures, of the order of 50 microns to several millimeters of mercury. The overhead line 72 from this still is provided to discharge a portion of the lighter-than-desired alkyl aluminum material. The bottoms lines 73 passes to the assembly of three cascaded rotary molecular stills 75, 80, 83.

The rotary molecular stills employed are high vacuum devices wherein a relatively thin film of liquid is established from the feed, and under the influence of vacuum and heat, the higher volatile molecules are vaporized, but are immediately thereafter entrapped or condensed on a condensing surface quite close to the vaporizing surface. The net feed to the center still 80 is through a line 78. Line 78 is joined by line 73, for receiving the bottoms from the topping still 71, and also by lines 85, 76, from the bottoms discharge of the last molecular still 83, and the overhead discharge from the first molecular still 75. The overhead from the intermediate molecular still 80 is discharged by line 81, which acts as a feed line to the final molecular still 83. The bottoms from the intermediate molecular still 80 is utilized as the feed to the first molecular still 75. Bottoms from the first still are discharged by the product line 77.

It is seen that the above arrangement of three molecular stills will provide a fractionation effect similar to a fractionating column having a plurality of plates, the actual number of plates being a function of the relative efficiency of each still. The use of this category of distillation apparatus is dictated by the fact that low pressures must be employed, and as an ordinary multi-plate fractionating column will result in appreciable pressure loss of the gases rising in the vapor-liquid contacting devices on individual trays, the operation at very low vacuums is not effective. In the molecular distillation type of apparatus, such pressure drops are largely circumvented.

The following example illustrates a typical operation employing the above described apparatus.

Example 8

In this operation, a trialkyl aluminum stream from the chain growing section was received through line 70, this stream peaking with the octyl aluminum groups, in terms of weight percent. The feed was "topped," i.e., a light fraction was distilled therefrom in the primary still 71, which was operated at a temperature of the order of about 95° C., and a pressure of approximately 80–90 microns mercury pressure. About 20 percent of the feed material was vaporized, the distillate discharged through line 72 having a maximum concentration of hexyl aluminum groups, the complete analysis of this overhead stream being given hereinafter. The bottoms from the first still 71, discharged through line 73, had approximately two-thirds of its weight as alkyl aluminum moieties of the 6–10, inc. carbon atom content, the full analysis being given hereinafter. This stream was fed to an intermediate distillation operation in the molecular still 80, and as already described, an overhead from that still was fed to a top distillation unit 83, the bottoms being to a heavy ends distillation unit 75. Coupled with the fresh feed to the molecular distillations in line 73 is the overhead from the heavy ends distillation 73 received through line 76, and the bottoms from the light ends distillation in still 83, this being transmitted in line 85. The several compositions developed by these distillations are given hereinafter.

The molecular distillations were carried out at temperatures of about 120° in the light ends stage 83, about 130° in the feed zone 80, and about 140° in the first stage 75. The pressures were respectively about 40, 15–20, and 30 microns mercury absolute pressure.

The stream compositions were as tabulated below:

|  | Stream Compositions—Weight Percent | | | | |
| --- | --- | --- | --- | --- | --- |
|  | Feed | First Distillate (72) | First Bottoms and Feed to Staged Distillation (73) | Recycle Light Ral Fraction (84) | Product Stream (77) |
| Alkyl Aluminum Component: | | | | | |
| $C_4$ | 10.7 | 34.5 | 5.9 | 4.6 | ---------- |
| $C_6$ | 24.8 | 39.5 | 23.7 | 25.8 | 0.4 |
| $C_8$ | 25.5 | 18.3 | 26.7 | 40.3 | 2.7 |
| $C_{10}$ | 19.8 | 5.6 | 20.5 | 18.9 | 19.9 |
| $C_{12}$ | 11.2 | 1.0 | 13.9 | 4.6 | 33.3 |
| $C_{14}$ | 5.2 | 0.6 | 5.6 | 0.7 | 24.2 |
| $C_{16}$ | 2.0 | 0.25 | 2.4 | 0.2 | 14 |
| $C_{18}$ | 0.7 | 0.12 | 0.8 | ---------- | 4.4 |
| $C_{20}$ | 0.2 | ---------- | 0.2 | ---------- | 1.3 |
| Weight ratio, $\frac{C_{12-16} \text{ al's}}{C_{4-10} \text{ al's}}$ | 0.23:1 | 0.02:1 | 0.29:1 | 0.06:1 | 3.11:1 |

CRYSTALLIZATION SEPARATION

Yet another technique applicable for the separating section of the present invention is the use of crystallization. Again, it has been discovered that a crystallization will accomplish a separation according to alkyl aluminum moieties which exceeds, in the separation effected, the separation which could be realized by the separation of individual molecular species of trialkyl aluminum components. Typical arrangement of apparatus for a crystallization separation according to the present process is illustrated in FIG. 5. Referring to FIG. 5, a series of seven crystallizers is illustrated, $91_1$, $91_2$–$91_7$. The feed to the system, a trialkyl aluminum feed line 90, transfers the trialkyl aluminum mixture from a chain growing section. A solvent line 95 is provided to introduce a low viscosity, alkane hydrocarbon liquid to the system. The discharge lines include a lower molecular weight alkyl line 94, and the solids product discharge line 93.

The crystallizers are arranged in staged manner, whereby the crystal crop from a first crystallizer is discharged to a subsequent crystallizer, and the liquid or mother liquor from said subsequent crystallizer is transferred to the said first crystallizer.

The crystallizers can be operated in continuous or intermittent fashion, dependent upon the apparatus characteristics of those in units employed. In many instances, batch crystallizing will be preferred, because, in fact, this affords the opportunity of providing a plurality of stages, but using a limited number of individual apparatus units. For high capacity installations, however, it will be advantageous to employ a plurality of units, one for each operating stage involved.

In a typical operation conducted in batch manner, for example, the trialkyl aluminum feed received through line 90 is charged to the first crystallizer $91_1$, which also receives a liquid phase from the subsequent crystallizer $91_2$, this phase being received through line $96_1$. The system thus established, including the fresh trialkyl aluminum from the chain growing section, the recycled or mother liquor received from line $96_1$ is agitated vigorously at an appropriate temperature, and a new crystal crop is generated. Upon termination of the crystallization, the solids are settled and transferred to the subsequent crystallizer $91_2$. The mother liquor liquid phase left is discharged through line 94. Similar sequencing is carried out in succession through all the crystallizing units $91_3$, $91_4$, $91_5$, $91_6$ and $91_7$. The feed to the terminal crystallization operation includes the crystal crop from the next but last crystallizer $91_6$, and solvent introduced through line 95.

It will be understood that the crystallizer unit $91_1$, usually includes built in devices for deliquefying the crystal crop. Even with relatively efficient deliquefying devices, it will be appreciated that a certain amount of adherent liquid phase is transferred with the crystal crop to the subsequent crystallizing operation.

As a further illustration of a specific operation according to this embodiment, the following working example is illustrative.

Example 9

The feed to this example provided through line 90 was a chain growth trialkyl aluminum mixture having the composition given in tabular form below. The mixture "peaks," or has as the major component, dodecyl aluminum moieties, having a concentration of about 18 weight percent. The alkane hydrocarbon solvent employed in this operation was n-pentane. The conditions of operation in the first crystallizer $91_1$ were as follows:

The charge to the first crystallizer $91_1$ included about 40 weight percent aluminum alkyls, the feed being approximately equally split between fresh aluminum alkyls and the aluminum alkyls in the solution received through line $96_1$ from the second crystallizer $91_2$. The solutions were cooled to −20° C. and thereafter to −70° C., for a total residence time of about 3 hours. At the conclusion of the crystallization period, the solid phase formed was separated from the liquid phase. The alkyl aluminum materials left dissolved in the liquid phase amounted to about 39–40 percent of the total dissolved alkyl aluminum material at the beginning of the crystallization.

To fully define the effects of the above described series of crystallizing and separation steps, the following table shows the composition of the several streams and illustrates the degree of separation implemented.

|  | Stream Compositions, Weight Percent | | |
| --- | --- | --- | --- |
|  | Feed (90) | Lower alkyl aluminum product (94) | Heavy alkyl aluminum product (93) |
| Alkyl aluminum component: | | | |
| $C_6$ | 10.0 | ---------- | 5.6 |
| $C_8$ | 11.6 | 29.6 | 9.0 |
| $C_{10}$ | 16.1 | 25.9 | 7.4 |
| $C_{12}$ | 17.5 | 23.8 | 7.0 |
| $C_{14}$ | 15.8 | 13.7 | 12.4 |
| $C_{16}$ | 12.6 | 4.9 | 18.2 |
| $C_{18}$ | 8.7 | 1.3 | 17.7 |
| $C_{20}$ | 4.8 | 0.8 | 12.0 |
| $C_{22}$ | 2.2 | ---------- | 6.8 |
| $C_{24}$ | 0.7 | ---------- | 3.9 |

Not all alkyl aluminum components were determined in the foregoing analyses, and the quantities reported are normalized to 100 percent. The solution of lower alkyl aluminum components 94 also included, for example, substantial quantities of hexyl aluminum components. The components given, however, show the very favorable separation achieved. Thus, the ratio of, for example, a heavy alkyl aluminum fraction in the solid discharged phase 93, to a light alkyl aluminum fraction, compared with the same ratio in the feed stream, is illustrated by the following table:

|  | Weight ratio, $C_{12-24}$ al's: $C_{6-10}$ al's |
|---|---|
| In fresh trialkyl aluminum feed (90) | 1.65:1 |
| In crystallized products (93) | 3.57:1 |

The foregoing shows the good degree of enrichment in higher alkyl aluminum moieties achieved in the solids formed in the last crystallizer $91_7$. It will be understood that these components are accompanied by minor quantities of solvent, in this case, n-pentane. Such adherent material can be removed by contacting with an inert gas. Alternatively, the alkyl aluminum content can be warmed to ambient temperatures, for liquefaction, and the pentane removed by vacuum flashing.

The light or lower alkyl aluminum stream released from the first crystallizer $91_1$ through the discharge line 94 is accompanied by four times its weight of pentane. This stream can be recirculated to the chain growing operation as is, or the pentane can be fractionated therefrom before recirculating the lower alkyl aluminum stream.

Inspection of the analyses given above, and for the other streams of the operation, showed that the operation provided a separation coefficient or factor, $\beta$, of 1.379. This refers to the ratio of distribution coefficients of two adjacent components in a single stage operation. The distribution coefficient, D, is defined as the weight ratio of a component in the crystallized phase, to that component in the liquid phase. Thus (the subscripts referring to a specific alkyl aluminum moiety). $\beta=D_8/D_6$. It has been found that the separation coefficient for successive pairs of adjacent alkyl aluminum moieties is approximately constant, thus, $\beta=D_{24}/D_{22}$, $D_{22}/D_{20}$, $D_{20}/D_{18}$, $D_{18}/D_{16}$, $D_{16}/D_{14}$ etc. From the foregoing, it is seen that knowledge of the value of the separation coefficient, for a system in one solvent system, will allow predetermination of the number of stages required for a given separation.

Other liquid media can be readily used for the crystallizing liquor. For example, other paraffin hydrocarbons such as butane, propane, or hexane can be readily used.

DISCUSSION

As discussed heretofore, a significant and salient feature of all forms of the present invention is that the separation provided is over and above that which would be anticipated possible. The surprising advantage of the various types of separations is illustrated graphically by the curves of FIG. 6. Referring to FIG. 6, several pairs of curves are given for the theoretical limiting separation obtainable and the separation actually achieved according to the methods described herein.

By theoretical limiting separation, is meant a complete separation of a given trialkyl aluminum feed mixture according to the total number of carbon atoms present in the various molecular species present. For example, in a system wherein various trialkyl aluminum compounds having a total of, say, 30 carbon atoms are present, these could be in the form of di-dodecyl hexyl aluminum, tridecyl aluminum, di-octyl tetradecyl aluminum, hexyl octyl, hexadecyl aluminum, and so on. A complete separation on the basis of the molecular weight, or the number of carbon atoms in these trialkyl aluminum molecular species would then put all the foregoing species in the same fraction, as they all contain 30 carbon atoms.

Referring more specifically to curve A of FIGURE 6, this is a perfect separation curve wherein all molecular species having 36 or less carbon atoms are separated in one fraction, and all molecular species having 38 or more carbon atoms in each molecule are in the other fraction. The curve, then presents in graphic form an index of the efficiency theoretically obtainable with an infinite number of separation stages no matter what the technique employed happens to be. The ordinate expressed on the curve represents the ratio of alkyl aluminum groups in the higher molecular weight fraction to the same alkyl aluminum moiety in the lighter or lower molecular weight fraction. Thus, considering a six carbon atom alkyl length, curve A shows that the maximum expected separation would result in the presence of hexyl groups in the higher molecular weight fraction equal to 0.15 the quantity in the lower molecular weight fraction. Similarly, considering the tetradecyl aluminum moiety, it would be expected that the higher molecular weight fraction would correspond to about 3.9 times the weight in the lower molecular weight fraction.

Curve B on the other hand, is similarly plotted for an actual separation of the type previously illustrated in Example 1 wherein the separation was achieved by contacting a trialkyl aluminum feed mixture with difluorochloromethane. Again, referring to the actual encountered distribution of alkyl aluminum moieties or groups in the several fractions realized, it is seen that the proportion of hexyl aluminum in the higher molecular weight fraction is substantially lower, relative to the corresponding identity in the lighter molecular weight fraction. The value actually encountered was 0.02, thus showing an actual separation far in excess of that which might be predictable. Similarly, with respect to the separation of tetradecyl aluminum moieties, the actual ratio was 6.5:1 or almost twice as great as the separation which would be predicted as the theoretically perfect separation.

The composition of the feed stream utilized for the separation graphically illustrated by curve B, and which was used for the prediction of limiting separation represented by curve A, was, as given below:

| Alkyl aluminum component: | Mole percent |
|---|---|
| $C_2$ | 5.0 |
| $C_4$ | 17.5 |
| $C_6$ | 30.9 |
| $C_8$ | 21.9 |
| $C_{10}$ | 14.1 |
| $C_{12}$ | 6.8 |
| $C_{14}$ | 2.5 |
| $C_{16}$ | 0.9 |
| $C_{18}$ | 0.25 |
| $C_{20}$ | 0.08 |

The foregoing feed stream, it will be seen, corresponds roughly to the feed stream processed as in Example 1.

When similar comparisons are made for the separations achieved by the other separation methods described herein, similar greater than predictable separations are achieved.

I claim:
1. An improved process for the manufacture of a trialkyl aluminum product having alkyl substituents in a predetermined chain length range, comprising in combination:
   (i) chain growing of ethylene on alkyl groups of a tri-lower alkyl aluminum feed (including a fresh tri-lower alkyl aluminum and a recycled tri-lower alkyl aluminum) to generate thereby an intermediate trialkyl-aluminum stream including higher and lower alkyl aluminum moieties,
   (ii) separating the intermediate tri-mixed alkyl aluminum into a tri-higher alkyl aluminum fraction and a tri-lower alkyl aluminum fraction, said fractions containing more of the higher and lower alkyl aluminum moieties, respectively than predicted on the basis of a perfect separation of trialkyl aluminum molecular species, said tri-lower alkyl aluminum fraction predominating in alkyl groups lower than the desired product, and
   (iii) recycling at least a portion of the tri-lower alkyl aluminum fraction to the chain growing step.

2. The improved process for the manufacture of a trialkyl aluminum product having alkyl substituents in a predetermined chain length range, comprising in combination
   (i) chain growing of ethylene on alkyl groups of a tri-lower alkyl aluminum feed (including a fresh tri-lower alkyl aluminum and a recycled tri-lower alkyl aluminum) and generating thereby an intermediate trialkylaluminum including higher and lower alkyl aluminum moieties, but only minor quantities of alkyl aluminum moieties of higher chain length than the desired range, and (ii) contacting said intermediate trialkyl stream with a solvent system including at least one solvent only partially miscible with trialkyl aluminum and dissolving a portion of the trialkyl aluminum therein, said portion being enriched in lower alkyl aluminum moieties in proportions greater than predicted on the basis of a perfect separation of trialkyl aluminum molecular species, separating said solvent phase and recycling at least a portion of the so-separated lower alkyl aluminum content predominating in alkyl groups lower than the desired product to the chain growing step.

3. The improved process for the manufacture of a trialkyl aluminum product having alkyl substituents in a predetermined chain length range, comprising in combination:

(i) chain growing of ethylene on alkyl groups of a tri-lower alkyl aluminum feed (including a fresh tri-lower alkyl aluminum and a recycled tri-lower alkyl aluminum) and generating thereby an intermediate trialkylaluminum including higher and lower alkyl aluminum moieties, but only minor quantities of alkyl aluminum moieties of higher chain length than the desired range, and (ii) vaporizing from said intermediate trialkyl stream a fraction enriched in lower alkyl aluminum moieties in proportions greater than predicted on the basis of perfect separation of trialkyl aluminum molecular species, and recycling at least a portion of the thus-separated lower alkyl aluminum stream predominating in alkyl groups lower than the desired product to the chain growing step.

4. The improved process for the manufacture of a trialkyl aluminum product having alkyl substituents in a predetermined chain length range, comprising in combination (i) chain growing of ethylene on alkyl groups of a tri-lower alkyl aluminum feed (including a fresh tri-lower alkyl aluminum and a recycled tri-lower alkyl aluminum) and generating thereby an intermediate trialkylaluminum including higher and lower alkyl aluminum moieties but only minor quantities of alkyl aluminum moieties of higher chain length than the desired range, and (ii) crystallizing from said intermediate trialkyl stream a fraction enriched in higher alkyl aluminum moieties in proportions greater than predicted on the basis of a perfect separation of trialkyl aluminum molecular species, separating the crystal crop and recycling at least a portion of the non-crystallized, lower alkyl aluminum fraction predominating in alkyl groups lower than the desired product to the chain growing step.

References Cited

UNITED STATES PATENTS

| | | | |
|---|---|---|---|
| 2,906,794 | 9/1959 | Aldridge et al. | 260—448 X |
| 3,207,771 | 9/1965 | Zosel | 260—448 |
| 3,270,065 | 8/1966 | Austin. | |
| 3,210,435 | 10/1965 | Kennedy et al. | |
| 2,813,917 | 11/1957 | Sharrah | 260—671 |
| 2,863,895 | 12/1958 | Kirshenbaum et al. | 260—448 |
| 2,971,969 | 2/1961 | Lobo | 260—448 |
| 2,975,108 | 3/1961 | Watt | 202—64 |
| 3,097,226 | 7/1963 | Napier | 260—448 |
| 3,352,940 | 11/1967 | Linden et al. | 260—683.15 |

TOBIAS E. LEVOW, *Primary Examiner.*

H. M. S. SNEED, *Assistant Examiner.*